United States Patent
Zabtcioglu

(10) Patent No.: US 6,729,857 B2
(45) Date of Patent: May 4, 2004

(54) WATER PRESSURE MULTIPLIER ENERGY GENERATION SYSTEM

(76) Inventor: Fikret Mehmet Zabtcioglu, Cliff Terrace Apts. #8 198 106th Ave. SE., Bellevue, WA (US) 98004

( * ) Notice: Subject to any disclaimer, the term of this patent is extended or adjusted under 35 U.S.C. 154(b) by 0 days.

(21) Appl. No.: 10/327,806

(22) Filed: Dec. 23, 2002

(65) Prior Publication Data

US 2003/0108431 A1 Jun. 12, 2003

Related U.S. Application Data

(63) Continuation of application No. 09/818,224, filed on Mar. 28, 2001, now abandoned.

(51) Int. Cl.[7] .......................... F04B 17/00; F04B 19/24
(52) U.S. Cl. .......................................... 417/330; 417/53
(58) Field of Search ................................ 417/330, 383, 417/53

(56) References Cited

U.S. PATENT DOCUMENTS

| | | | | |
|---|---|---|---|---|
| 1,175,287 A | * | 3/1916 | Olmsted | 417/330 |
| 3,028,727 A | * | 4/1962 | Anston | 60/473 |
| 3,805,515 A | * | 4/1974 | Zener | 60/641.7 |
| 4,041,707 A | * | 8/1977 | Spector | 60/641.14 |
| 4,170,878 A | * | 10/1979 | Jahnig | 60/641.7 |
| 4,216,657 A | * | 8/1980 | Ridgway | 60/641.7 |
| 5,263,322 A | * | 11/1993 | Molini | 60/398 |
| 5,473,892 A | * | 12/1995 | Margittai | 60/398 |
| 5,582,691 A | * | 12/1996 | Flynn et al. | 203/11 |
| 5,899,066 A | * | 5/1999 | Brassea-Flores | 60/496 |
| 6,100,600 A | * | 8/2000 | Pflanz | 290/54 |
| 6,457,307 B1 | * | 10/2002 | Feldman et al. | 60/398 |

FOREIGN PATENT DOCUMENTS

JP  5-256248  * 10/1993  ........... F03B/17/02

* cited by examiner

Primary Examiner—Justine R. Yu
Assistant Examiner—Timothy P. Solak
(74) Attorney, Agent, or Firm—Dean A. Craine

(57) ABSTRACT

An energy conversion system using the static head pressure of large bodies of water to compress a gas. A Pascal hydraulic link between a small piston and a large piston multiplies the force of the large piston compressing the gas. Heat transfer is established between the gas compressed by the large piston and a fluid used to drive a turbine. After time, the static head pressure on the small piston is relieved allowing the compressed gas to expand ending a cycle. Electrical energy is produced by a generator driven by the turbine using thermal energy generated by repeated compressions of the gas.

20 Claims, 7 Drawing Sheets

WATER PRESSURE MULTIPLIER ENERGY GENERATION SYSTEM

CROSS REFERENCE TO RELATED APPLICATIONS

This is a continuation application of U.S. patent application, Ser. No. 09/818,224, filed on Mar. 28, 2001, now abandoned.

STATEMENT REGARGDING FEDERALLY SPONSERED RESEARCH OR DEVELOPMENT

Not applicable.

BACKGROUND OF THE INVENTION

This invention relates to methods of deriving energy from large bodies of water. A body of water could be an ocean, lake or a man made water mass. It is more particularly concerned with a specific technology which can utilize a renewable & environment friendly energy, the water pressure that exists at certain depths within any large water mass. The system is based on the continous availability of water pressure, for example within oceans & lakes, but is not limited to natural oceans & lakes, man made water reservoirs could also serve the same purpose, if such water body has about 200 meters depth. Invention aims to utilize water pressure, using a special apparatus to compress a low density, highly compressable gas within a relatively short time, in order to increase the temperature of such gas, by increasing the pressure of the same. The high pressure & high temperature gas obtained by this compression is then stabilized at an adjacent insulated volume—which stabilizes & transfers the heat to the semi-thermos volume. Within this semi-thermos volume, the closed cycle working gas is circulated through spiral pipes.

Within this volume, tempeature of working gas increases due to thermal equilibrium with the semi-thermos volume. Continuity becomes possible as compressions are repeatable, for re-generating additonal thermal energy input with each repeated compression.

Various methods of generating power from oceans have been proposed or developed. The ones that are in a marine environment are OTEC, ebb & tide systems, wave energy. More specifically related to renewable energy sources & to the ocean environment, the following concepts & methods for generating power from oceans are current state of the art.

There are more than twenty one such patented systems on this general subject area, namely renewable energy generation from ocean waters. Non of these have the same technical method as the Water Pressure Multiplier Energy Generation System. Below are some examples. Only ones which do not have an external thermal differentials of sea water dependency (OTEC) for their functioning and which could be considered relevant to this invention, are mentioned.

From U.S. Pat. No. 5,263,322 Date of patent: Nov. 23, 1993 Method of Recovering Energy From Liquids in Deep Cavities, Inventor: Alberto E. Molini. This system uses the buoyancy property of gases disolved in deep liquids. The only similarity or common issue with my invention is the fact that this system also makes use of the hydrostatic pressure of a deep liquid as an initiator, but for a different process. From U.S. Pat. No. 6,100,600 Date of patent: August 2000 Maritime Power Plant System With Processes for Producing, Storing and Consuming Regenerative Energy. Inventor: Tassilo Pflanz. This is a combination renewable energy system. It has many different renewable energy system generations combined on a marine platform. The only similarity to my invention is that this system also has wind &/or solar energy generation—which in my system would exist at sea surface for operational energy only.

From Japanese Pat. No. JP405256248A Pubn-Date: Oct. 5, 1993 Seawater Hydraulic Generating Plant. Inventor: Kato, Takehito. This system is close in principle, to river water based dam systems—where the generators are turned by the flow of water. The only similar aspect of this invention to my system is that, this system also has its' main input as water pressure. But with two big differences: This system lets the high pressure external water enter the system directly to do work against water turbines & hence is 100% water based, not gas. The main prior art OTEC, requires external sea water thermal gradient of a minimum of 20 C. temperature differential between different layers of sea water. This limits geographic regions to only certain latitudes. OTEC is expensive due to expensive heat exchangers & long & large diameter pipes. Even the advanced OTEC systems require very large amounts of pumping; 2,500,000 pounds of warm sea water per minute as input. Outputs of 1,780,000 pounds of sea water to the evaporator.

Ebb & tide systems are also subject to geographic constraints & require investments that are too costly. Neither could wave energy systems prove to be a globally applicable efficient energy generation system, as these mostly depend on wind directions.

OTEC systems have costly requirements; such as warm water flows of 7,450 kg/sec/Mw & oveall great amounts of water displacement needs. Prior art systems also require cold water pipes with large diameters (57 feet per Mw) which all add to high costs.

Therefore, there is a need for a lower cost system, which is less complicated but achieves an efficient way of renewable energy generation. This system (Water Pressure Multiplier Energy Generation System,) would not have the constraints which prior art have. It would not depend on temperature differentials between external water layers, it would not need massive vertical structures, no use or problems about the dissolved gases of the sea water would be involved, no requirements about salinity differentials between lower & upper layers of sea water, no dependency on weather conditions above sea water surface, and most importantly, no need to reach depths of 500 meters or more.

SUMMARY OF THE INVENTION

The present invention is a system for pressurizing gas repeatedly. The system includes a fixed two cylinder structure, which are connected to each other with a pipe. The cylinder structures are positioned at a specific depth below the surface standing horizontally within a body of water. Within the cylinders are two different area pistons, which can move within the inner volume of cylinders with near zero friction. One has a smaller diameter & hence area & the other larger one, three times the area of the of the smaller. Only the smaller area surface of the piston which can move within the cylinder, is periodically subjected to external water pressure. (This is phase 1.)

When subjected to external water pressure as a result of opening a shiftable closure, small area piston transmits this external force, mechanically via the hydraulic oil to the larger area piston. (Phase 2.)

As a result, the external water pressure input force from the small area piston is multiplied at the other larger area piston side.

The large area nonconducting piston then pressurizes a specific gas volume above it, and compresses this gas volume within a short time to $\frac{1}{17}$ of its' initial volume. (Phase 3.)

As a result of this compression of the gas to 1/17 of its' initial volume, the temperature of this gas increases 25 fold. This thermal energy generated internally is stablized within a range of minimum variation in an adjacent temperature stabilization & transfer-volume-heat chamber. Thermal energy is utilized to obtain thermal equilibrium with the semi-thermos volume, in which the working gas closed cycle pipe system is also located. At this temperture range the working gas attains high pressure to turn generators. (Phase 4)

Working gas passing the generators is then re-circulated without a condensation process. (Thereby minimizing energy loss of the working gas.)

Continuity of high pressure availibility for the working gas would be due to the fact that input pressure compressions are repeatable—every 25 minutes, re-supplying thermal energy input due to compressions.

System solves problems that prior art have; the need for complicated & costly structures, based mostly on an operational principle which depends on external temperature gradients of different depths of sea water. As a result of this, these require large water masses to be pumped & are subject to reach great depths of the sea water. Large sea water quantities have to be pumped up from great depths. Furthermore, the required temperature differential of 20 C. occur only at certain latitudes. (Between 20 north & 20 south latitutes; OTEC.)

This system does not need wave energy. Wave energy systems also have geographic limitations, for these depend on areas where such wave action is strong enough & continous. Such areas are very limited.

Main science & technology facts on which this invention is based are:

1. The fact that any water mass with a depth of 300 meters has a hydrostatic pressure of 30 atm.
2. The non-compressability of fluids, as in an enclosed container with a fluid of oil, as within the Pascal hydraulic-which is a force multuplier device,
3. Compressability of of gases, gas of low density, high compressibility,
4. High efficiency energy conservation & thermal equilibrium condition with limited energy loss by the application of the thermos principle—as a surrounding volume—to derive & generate a closed cycle high pressure working gas.
5. Net energy conversion of the final phase of high pressure working gas (kinetic through the turbines,) becomes mechanic to electric, which has 97% net efficiency.

In effect, if force applied is increased only three times at the larger piston side due to the Pascal hydraulic multiplier effect, initial force applied being the external water pressure from one side, then this is obtaining the water pressure of 900 meters water depth, at only 300 meters!

Therefore, this system is able to generate a very high pressure without having to place the system at extreme depths! (Note that if placed at deeper waters, a very high pressure multiplication would result—but operation would be more difficult.)

DETAILED DESCRIPTION OF THE INVENTION

Figure 1:
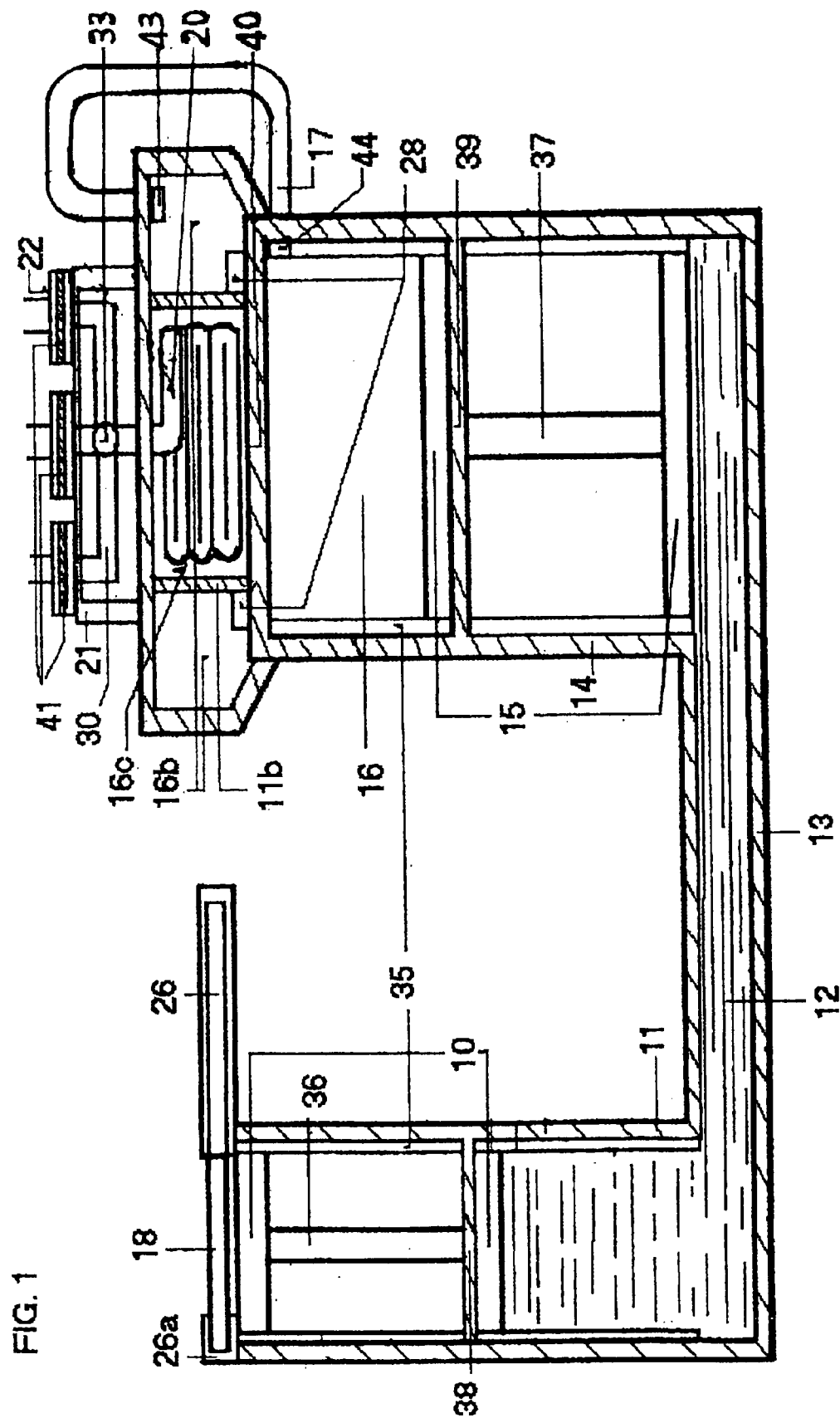
FIG. 1. is a plan view of the system, showing the closed state of the closure 18, of which the function is temporarily to close, so that the water pressure would not apply on the small piston, while closure is closed. Both small 10 & large pistons 15, are at the pre-compression position & the hydraulic oil 12, is not activated yet.

With reference to FIG. 1, the fixed structure with two cylinders 11 and 14, with internal surface coating 35, are connected with a pipe 13, both cylinders stand horizontally. This is to minimize vertical distance between small area piston cylinder discharge pipe exit point 23, and the sea surface, so that when small area water proof piston 10, is displaced by water column 42, which has to be discharged, this minimizes overall vertical distance and hence vertical distance of discharge pipe 25, to the sea surface. (Water proof means: Water on the upper face of piston, does not go through, to below that of water contact surface of small area piston 10, from sides, water is above—never below piston 10.)

Refering to FIG. 1, the reference numeral 18, refers to the shiftable closure with housing 26, of which the function is temporarily to close & then open & thereby first hinder the water pressure, to have effect on the small area piston 10, and then, as this closure 18, is shifted & opens infront of the small area piston 10, to subject the small area piston 10, to 30 atm pressure.

Figure 5:
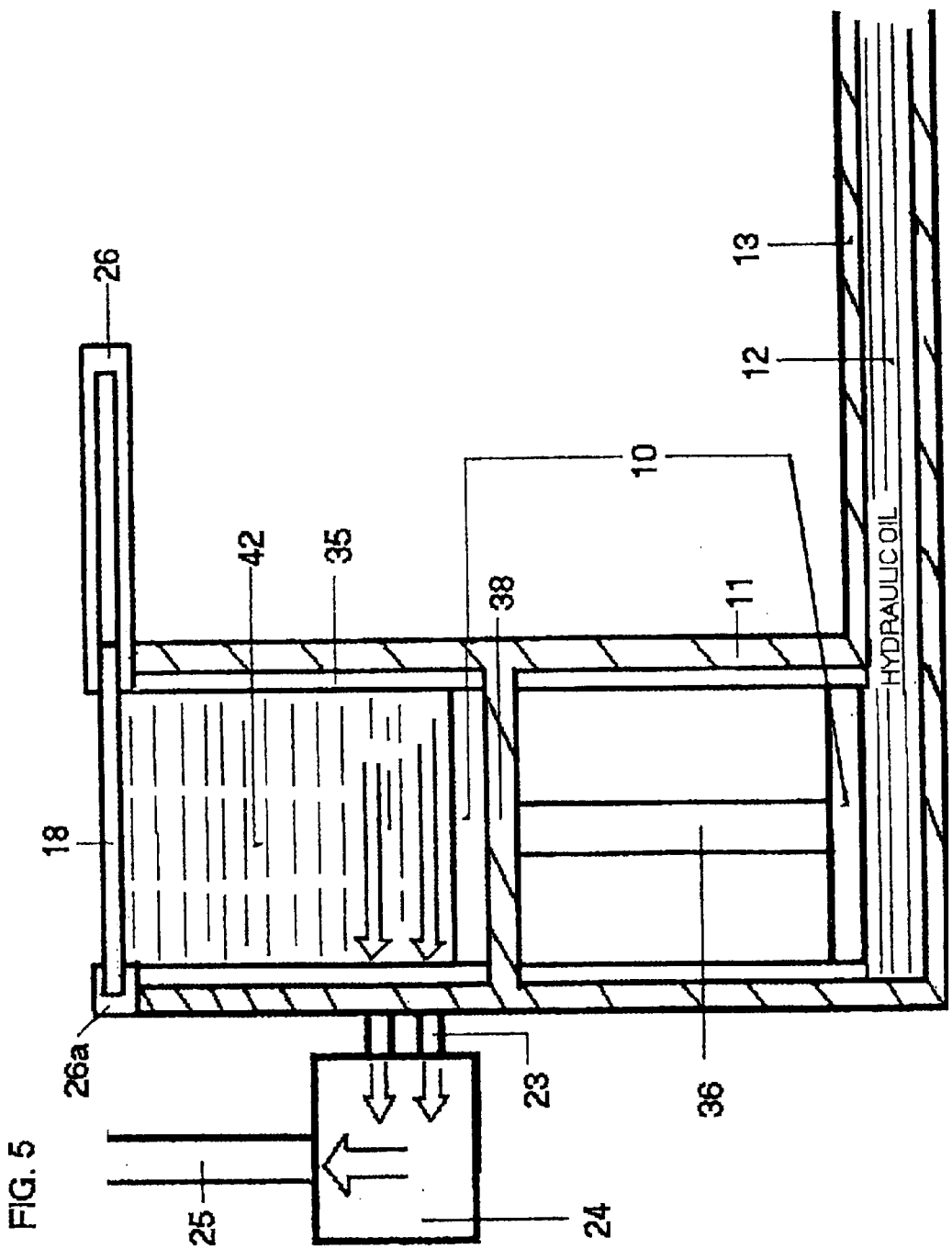
FIG. 5. is a plan view of the system, showing how the shiftable closure 18, infront of the small area piston 10, closes & the water volume 42, which enters & applies a force on the small piston, it shows how water 42, gets trapped that is to be discharged, between the small area piston & closure 18, which separates this volume from the external water mass. (Small piston side depicted.) At this time, this part of the system is made ready for discharge, so that both the small 10, & large area pistons 15, could return to their respective pre-compression positions & the next compression could be started. Discharge pump 24 & discharge pipe 25, to water surface also shown.
Figure 6:
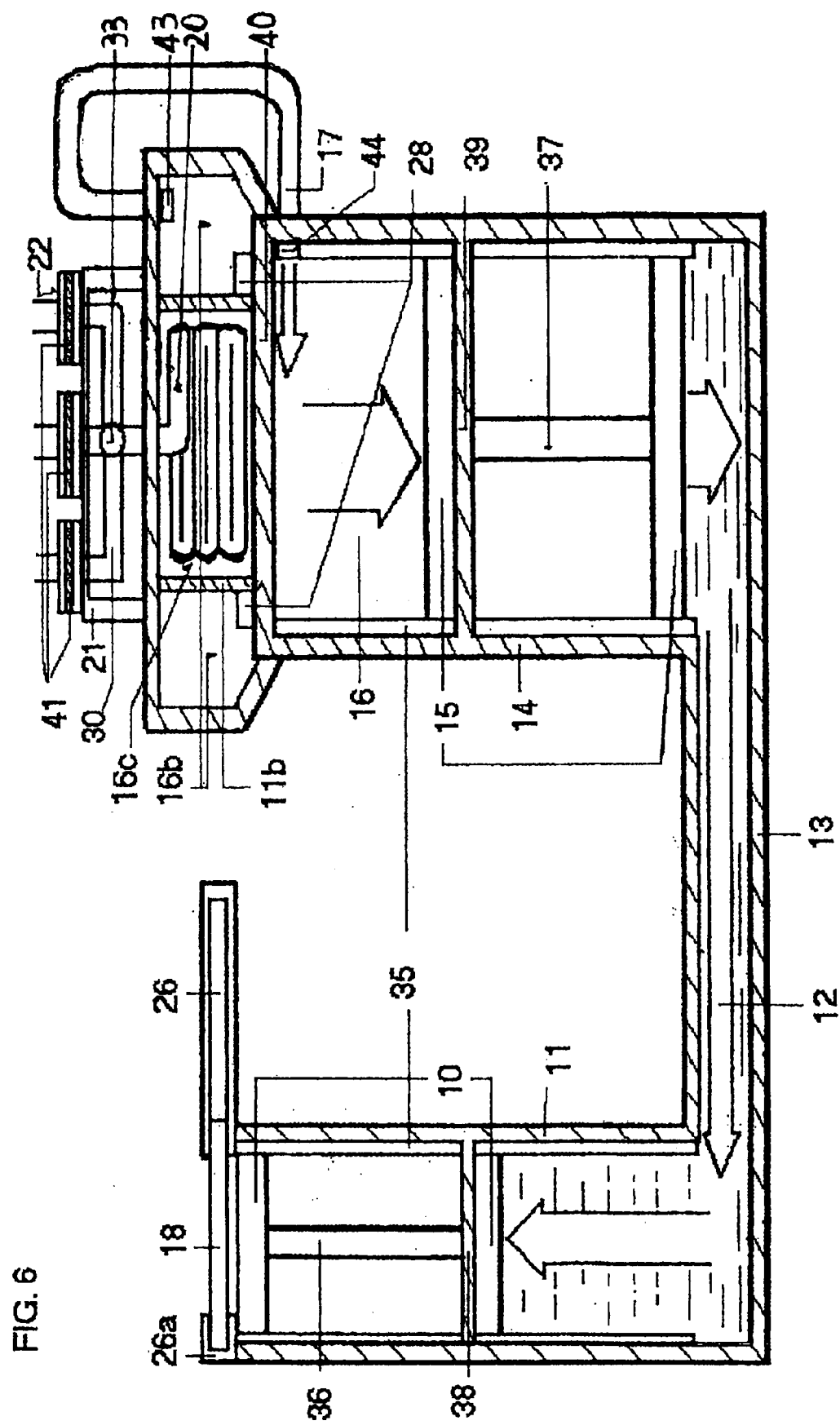
FIG. 6. is a plan view, showing what happens when the entire water volume 42, is discharged & how both pistons 10 & 15, return to their pre-compression positions. (Phase 4)

Referring to FIG. 5, as closure 18, closes again, after water volume moves into the upper volume of cylinder, where small area piston 10, gets displaced and as small area piston 10, is displaced all the distance it can move—it establishes a water volume 42, between the displaced small area piston 10, and itself—the shiftable closure 18, and cylinder walls 11, which has internal coating 35, frictionless coating. This volume 42, is then the volume of water which initially causes the small area piston 10, to be displaced, and has to be discharged to the sea surface, in order to enable the small area piston 10, which was displaced and pressurized by the hydraulic oil 12, to return back to its' initial pre-compression position.

Referring to FIG. 5, the discharge is made by a double vertical discharge pipe pumping system, 23–24 and 25 which discharges the water volume 42, that stands in this cylinder volume, between the small area piston 10, and shiftable closed closure 18, to the sea surface where atmospheric pressure is only 1 atm. The operational energy for water discharge would be provided by sea surface wind and/or solar energy, which could be positioned on top of the sea surface as a platform, where below 300 meters water depth, the under water system would be located.

Referring to FIGS. 1, 2, 3 and 4, as small area piston 10, is displaced, it provides the input force applied to the Pascal hydraulic 12, part of the system. The hydraulic 12, transmits and multiplies the force applied, proportional to how much larger, the larger nonconducting area piston 15 is.

Figure 2:
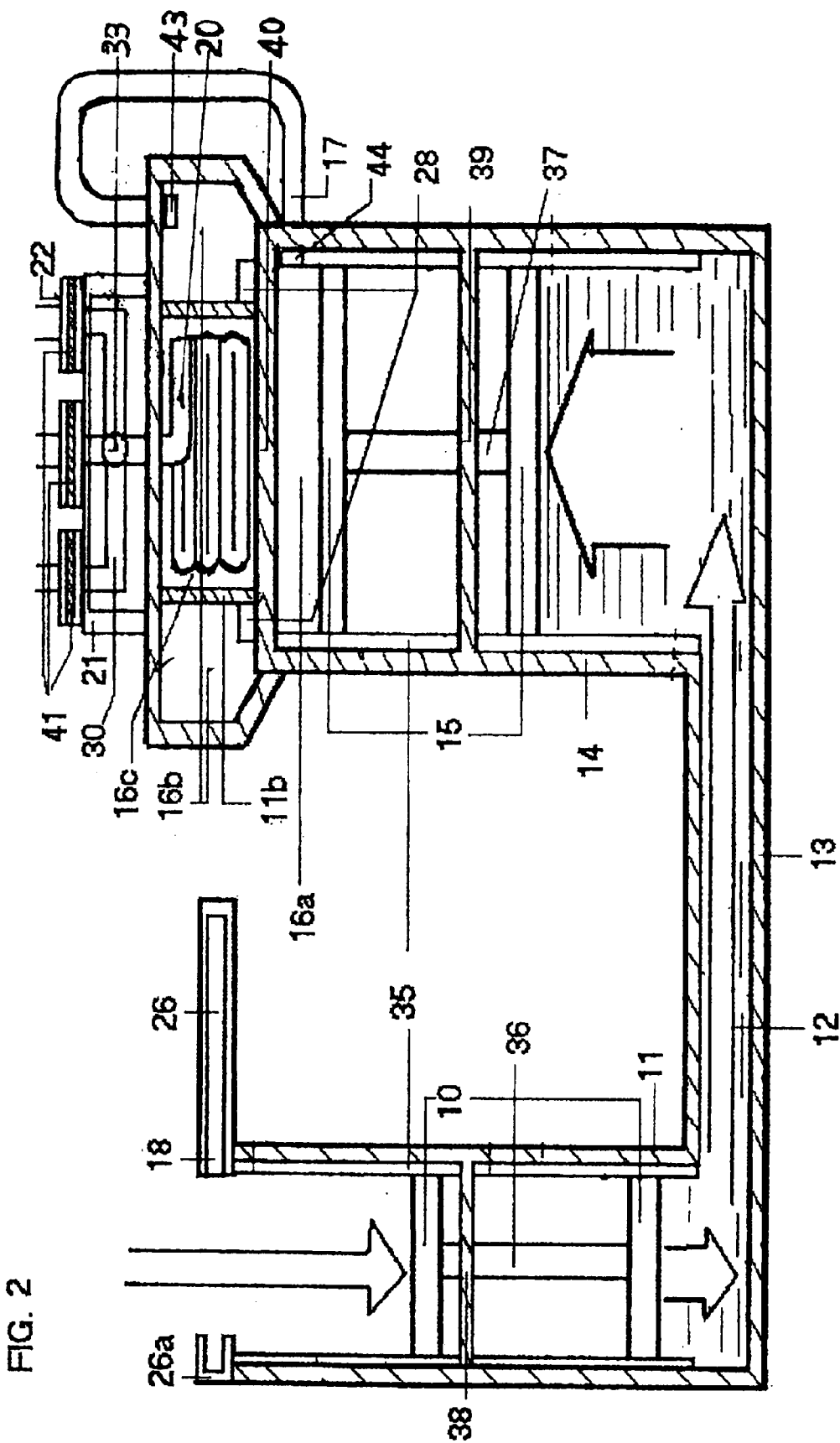
FIG. 2. is a plan view of the system, showing what happens when the closure 18 opens & the external water pressure is applied on the small area piston 10. Shows how force applied from one side gets multiplied within a short time at the larger area piston 15, via the hydraulic 12 (Phase 1.)
Figure 3:
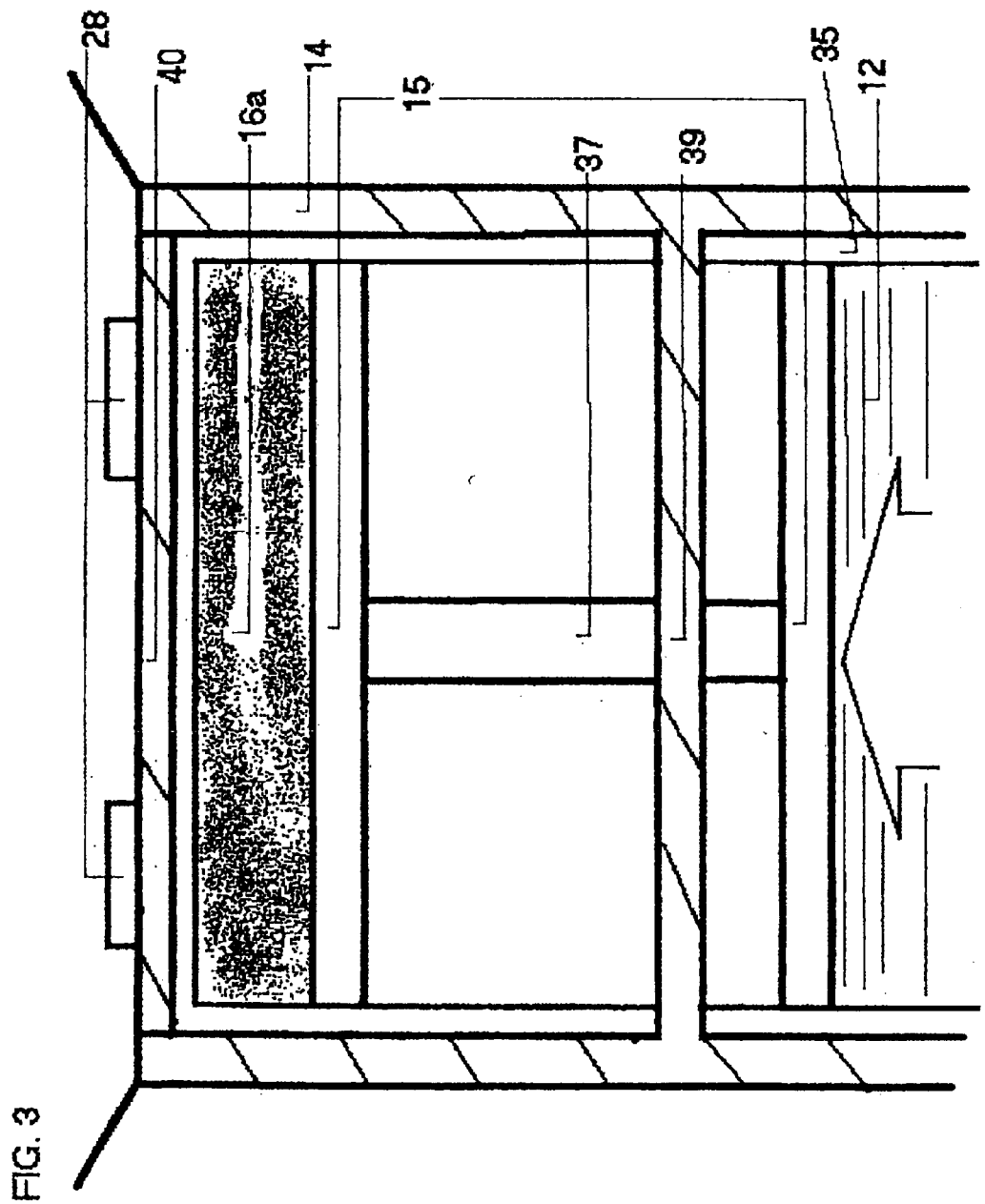
FIG. 3. is an enlarged plan view of the system, showing how the gas 16a, is compressed, to 1/17 of its' initial pre-compression 16 volume, which results in an increased thermal energy. At this phase, one directional gas valves 28, (there are two of these) are closed. (Only the compression side, with only compressed volume section is depicted.) (Phase 2.)

Referring to FIGS. 2 and 3, if larger area piston 15, has an area three times that of the smaller area piston 10, then the force applied at the small area piston 10, side is multiplied by three.

With reference to FIGS. 2 and 3, since at below sea or water mass of 300 meters depth, there exists a continuous-non-variable pressure of 30 atm, this 30 atm pressure is multiplied by three and becomes 90 atm (as external input pressure,) to the larger area piston 15.

With reference to FIG. 2, but the displacement distance of the larger area piston 15, has an inverse relationship with the area of large area piston 15, and hence also with multiplier of force. If area of large area piston 15, is three times the small area piston 10, then the distance of displacement of the large area piston 15, is $\frac{1}{3}$ of the distance that small area piston 10, is displaced. That means, if small area piston 10, displacement distance is 100 m, then the displacement large area piston is only 0.3333.times.100=33.3 meters. The displacement distances of both pistons, is equivalent to the h=height, in the formula of the cylinder: (Since both cylinders stand horizontal, h of cylinders becomes horizontal.)

$$\pi r^2 h \tag{1}$$

In the above example, the h of small area piston is 100 m & the h of large area piston then is 33.3 m and these represent the distances of relative displacements of the two pistons.

With reference to 2 and 3, this also means that, if compression is $\frac{1}{17}$ of initial volume, and since the large area piston 15 is the only one that does the gas compression, then $33.3/17=1.96$ m. That is, the large area piston 15, would be displaced within the cylinder 14, a total of 33.3 meters, of which 1.96 meters is the distance which further displace-ment would not occur, or slow down, as the gas in 16*a* would be compressed to $\frac{1}{17}$ of its' initial volume 16. (During this time, the one directional non-return gas valves 28, between gas volumes 16*a* and 16*b* are closed.)

With reference to FIGS. 2 and 3, therefore, for the compressing function, large area piston 15, would be displaced 31.37 m., 1.96 m belonging to the cylinder volume remaining above the large area 15. All figures are not exact—to give proportionality. Exact optimal scale-size can be obtained by computer simulation. Such pressure then compresses a compressible gas 16*a*, above the large area piston 15, within a short time, to {fraction ($\frac{1}{17}$)} of its' initial pre-compressed volume 16. The result of this compression is an increased pressure and increased temperature of this compressed gas 16*a*. Thermal energy generated this way constitutes phase 1.

Figure 4:
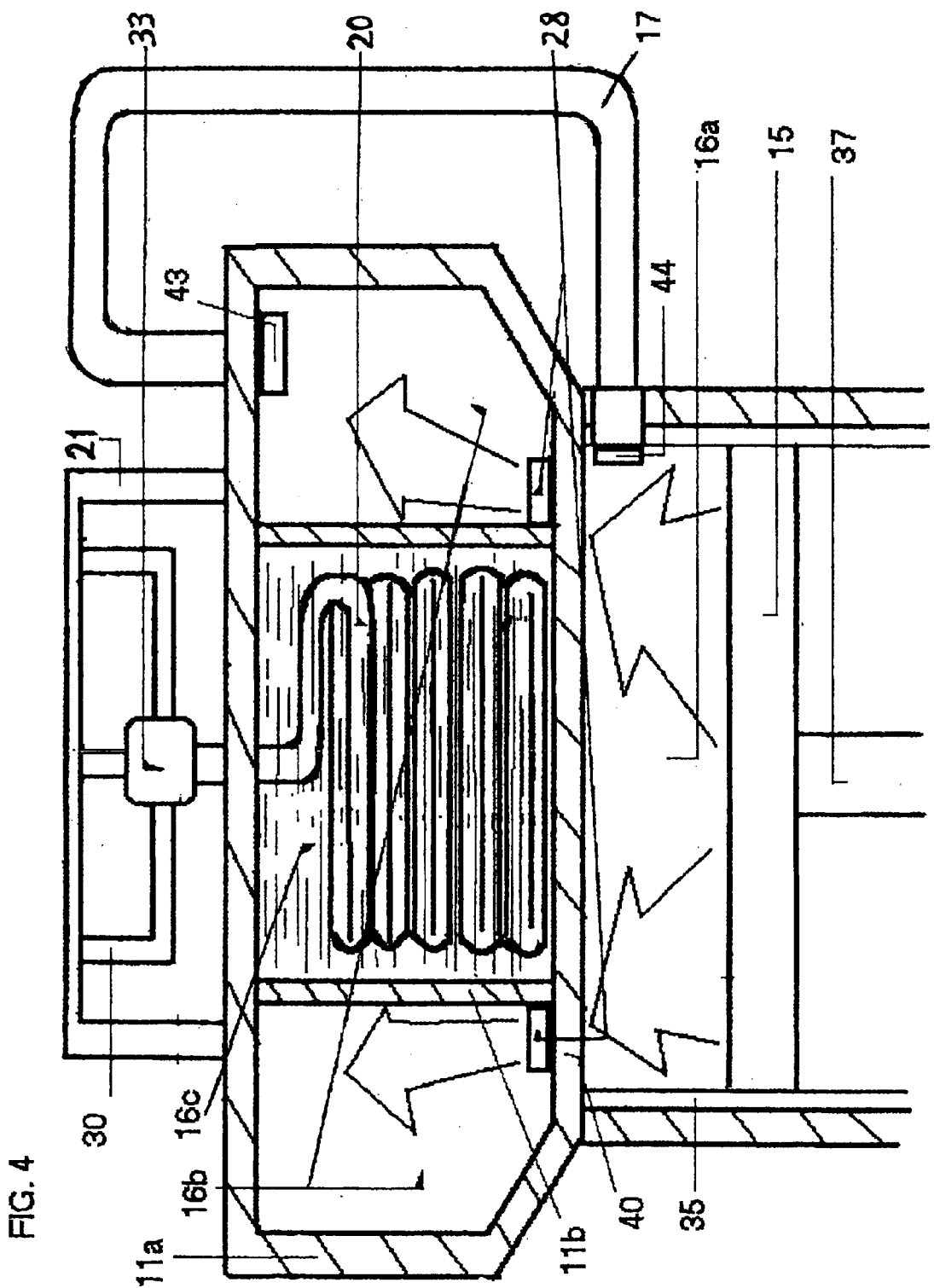
FIG. 4. is a plan view of the system, showing how the thermal energy generated by way of compression is transfered through one directional gas valves 28, to an adjacent thermal stabilization volume, (16b) within this volume, is a third volume which contains oil (16c) & within this volume is also a part of closed cycle working gas pipe loop—as spiral pipes (20), which reaches thermal equilibrium with the high temperature oil 16c. Also showing the valves 43–44, which enable the stabilization volume gas 16b, to circulate and keep the required temperature. And to enable large piston to make its' decompression move by returning gas to the volume 16a, above piston 15, through valve 44, so that piston 15, could go back to pre-compression position. (Phase 3.)

Then, this high pressure, high temperature gas 16*a*, is placed into an adjacent temperature stabilization and heat transfer volume 16*b*, by one directional gas valves 28. At this time, the temperature stabilization volume pressure regulation loop 17, valve 43, is closed, and gas routing back to volume 16*a*, gas valve 44, is also closed—this s a pressure control routing pipe and valves to regulate pressure of 16*b*. This is phase 3. As a high temperature range with minimized fluctuations within the 16*b* is achieved, and since this volume 16*b*, contains 16*c*, and designed to transfer heat to 16*c*, the semi-thermos (oil,) volume 16*c*, where within this is the working gas pipe 20, in the form of spiral routing pipes 20. Here, working gas 20*a*, also attains a high temperature average. (20*a* is in 20.) With reference to FIG. 4, this volume 16*c*, facilitates thermal equilibrium condition for volume 20*a*, with itself volume 16*c*. (Phase 4: This phase, once reached, achieves continuity, as long as heat is re-supplied as a result of repeated compressions of piston 15, which is to repeat compressions every 25 minutes.) Closed cycle spiral gas volume 20*a*, is the working gas which turns the generators 41.

When phase 4 is reached, system achieves thermal stability within 16*c*.

With reference to FIGS. 2, 3 and 4, that is the heat generated in volume 16*a*, is repeatedly transferred into volume 16*b*, and spiral pipe 20, achieves thermal equilibrium with semi-thermos oil volume 16*c*, as oil volume 16*c*, has the highest thermal stability among all three volumes. When volume 16*a*, heat generated, is placed into 16*b*-heat transfer volume, decompression move of the large area piston 15 starts. (As a function of completing the discharge of volume 42,) which results in the re-positioning of the small area piston 10, to its' pre-compression position. (When large area piston starts its' decompression volume, gas valves 43 and 44, open to enable partial gas outflow form 16*b*, routing back into 16*a*, as large area piston is making its' decompression move. This also serves a relatively high temperature gas to be compressed, at the next compression. But the one directional gas valves 28, are closed.)

Research indicates that material most resistant to the sea water or water environment is concrete or polyvinyl-chloride which may be applied for the external coating of the cylinders. For the moving pistons & the internal sides of the cylinders within which the pistons would move, the invention of Near frictionless carbon coating (NFC) material 35, invented and developed by the Argonne National Laboratories may be applicable. Commercial application field tests of this material (NFC,) started, but it has no brand name yet. If not, such surface has to be made with minimum friction & water proof material.

Following formula explains the adiabatic process which results from the compression of the large area piston 15, compressing the gas volume 16a, to ¹/₁₇ of its' initial volume 16, if pre-compression volume 16, temperature is 27° C.+ & pre-compression pressure is 1.0×10⁵ Pa:

$$T_2 = T_1(V_1/V_2)^{\gamma-1} = (300\text{ K}) \times (17^{.40}) = 1{,}004\text{ K} = 675°\text{ C}. \quad (2)$$

(If air with Gamma=1,40 is compressed. Another low density, highly compressible industrial gas may be applied which would be more suitable for this purpose.)

With reference to FIGS. 3 and 4, even if this high temperature would not be reached at the very first compression, which is an adiabatic increase—because this increase in temperature could be re-supplied back into volume 16a, via the loop 17, with valve 43, out of 16b, and valve 44, into 16a,—at each decompression of piston 15, a heated gas feedback would occur and each compression that would follow, would have a higher pre-compression initial temperature to start with. After several compressions, such high temperature range as 600–675 C. would be reached.

To calculate the presssure following formula applies:

$$p_2 = p_1(V_1/V_2)^\gamma = (1.0 \times 10^5\text{ Pa})(17^{1.40}) > 49\text{ atm} \quad (3)$$

(If compressed air gas is air, with Gamma=1.40 & initial temperature is 27° C. with initial pressure of 1.0×10⁵ Pa.)

The net work W done by the working gas can be approximated with this formula:

(Basis internal energy U.)

$U2-U1=\text{Delta}U=Q-W.(Q+\text{Energy added, }W=\text{Work.})$ $U2-U1=U=-W$(Adiabatic, but adiabatic compressions are repeatable.) (4)

Figure 7:
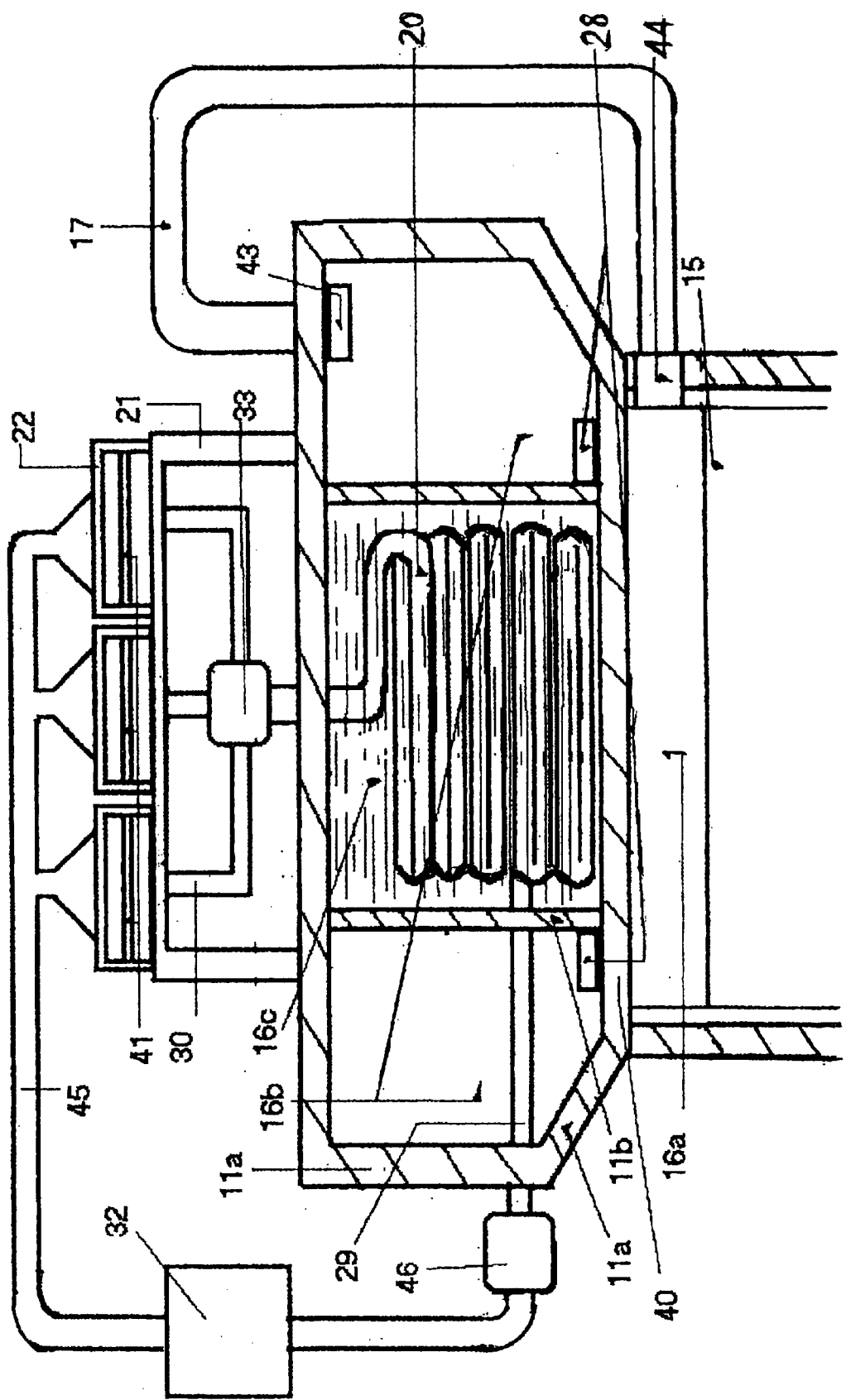
FIG. 7. is plan view, showing how the working gas 20a, passes the generators 41, & what the gas conditioning components on recycling pipe 45, are: Decompression unit 32, gas pump 46, re-entry into volumes 16b, & 16c, pipe 29, to make recycling possible without a condensation process.

With reference to FIGS. 3, 4 and 7, when working gas 20a, attains thermal equilibrium and it becomes a superheated gas 20a, this working gas 20a is distributed to the three turbines 41 by distributor valve 33. (The working gas 20a, which attains thermal equilibrium with 16c, within closed cycle 20, which then returns to 16c, at lower than thermal equilibrium temperature & lower pressure after passing the generators 41, & in a pipe 45, then subjected to decompression, in decompression unit 32, & then gas is pumped by pump 46, into the volume 16c, where its' pressure increases as it reaches thermal equilibrium again.)

What is claimed is:

1. An energy conversion system for use under the static head pressure of large bodies of water to convert the force of the head pressure into usable electrical energy comprising:
    a first cylinder with a first working chamber located between a first piston and a top section of the first cylinder,
    a second cylinder with a second working chamber located between a second piston and a top section of the second cylinder,
    wherein said second cylinder and second piston are of a predetermined diameter size larger than said first cylinder and said first piston, and a bottom section of said first cylinder is connected to a bottom section of said second cylinder via a hydraulic link; and
    a valve to open and close fluid communication between said first working chamber and a large body of water,
    a first pump for evacuation of said first chamber when said valve is closed,
    a heat exchanger in communication with said second working chamber for transfer heat from a trapped gas inside said second working chamber to a fluid inside said heat exchanger;
    a second pump for circulating said fluid through a turbine and said heat exchanger,
    an electrical generator connected to said turbine.

2. The system of claim 1, wherein said heat exchanger comprises spiral pipes surrounded by an oil.

3. The system of claim 2, further comprising a thermal stabilization area, in communication with said second working chamber, surrounding and in heat transfer contact with said heat exchanger.

4. The system of claim 3, further comprising a second valve located between said second working chamber and said thermal stabilization area.

5. The system of claim 1, wherein said predetermine diameter size larger, is three times larger.

6. The system of claim 1, wherein said hydraulic link comprises a hydraulic oil.

7. A method of generating power from the static head pressure of large bodies of water comprising the steps of:
    connecting a second side of a small diameter piston/cylinder combination via a hydraulic link to a second side of a large diameter piston/cylinder combination;
    adiabatically compressing a gas on a first side of said large diameter piston/cylinder combination by placing a first side of said small diameter piston/cylinder combination in communication with a means for exerting a force thereon;
    transferring heat from said compressed gas into a fluid by using a first pump to pump said fluid through a heat exchanger, located in communication with said compressed gas; and
    circulating said fluid through a turbine connected to a generator.

8. The method of claim 7, wherein said large diameter piston/cylinder combination is three times the diameter of said small diameter piston/cylinder combination.

9. The method of claim 7, further comprises filling said hydraulic link with a hydraulic oil.

10. The method of claim 7, further comprising the step of surrounding the heat exchanger with a thermal stabilization area in communication with said compressed gas and in heat transfer contact with said heat exchanger.

11. The method of claim 10, further comprising the step of communicating said compress gas through a second valve into said stabilization area.

12. The method of claim 7, wherein the step of pumping said fluid through a heat exchanger further comprises pumping said fluid through spiral pipes surrounded by an oil, contained within said heat exchanger.

13. The method of claim 7, wherein the step of placing said small diameter/piston cylinder combination in communication with a static head pressure of a large body of water, further comprises using a first valve to open and stop communication.

14. The method of claim 13, further comprising the step of stopping communication, between said static head pressure of a large body of water and said first side of small diameter/piston cylinder combination, by closing said first valve.

15. The method of claim 14, further comprising the step of completing a cycle by evacuating said first side of small diameter/piston cylinder combination using a second pump.

16. The method of claim 15, further comprising the step of repeating said cycle by opening said first valve, thereby placing said first side of said small diameter/piston cylinder combination in communication with said static head pressure of a large body of water.

17. The method of claim 16, further comprising the step of repeating the cycle at a predetermined time interval.

18. The method of claim 16, further comprising the step of repeating the cycle every 25 minutes.

19. The method of claim 7, wherein the step of transferring heat from said compressed gas into a fluid, increases the temperature range of the fluid to 550°–550° C.

20. The method of claim 7, wherein the step of adiabatic compressing a gas on a second side of said large diameter piston cylinder combination, further comprises compressing the gas to $\frac{1}{17}$ of its initial volume.

* * * * *